(No Model.)
A. T. BODLE.
BRAKE FOR VEHICLES.
No. 461,414. Patented Oct. 20, 1891.
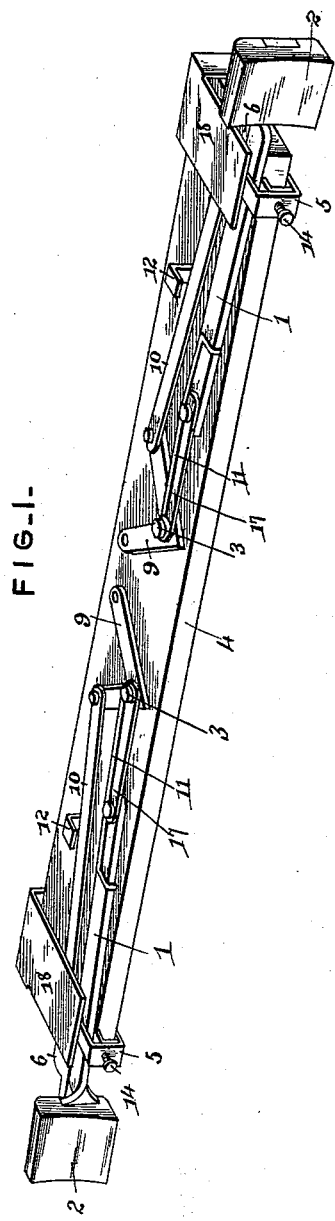
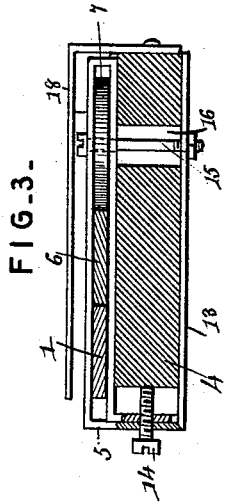
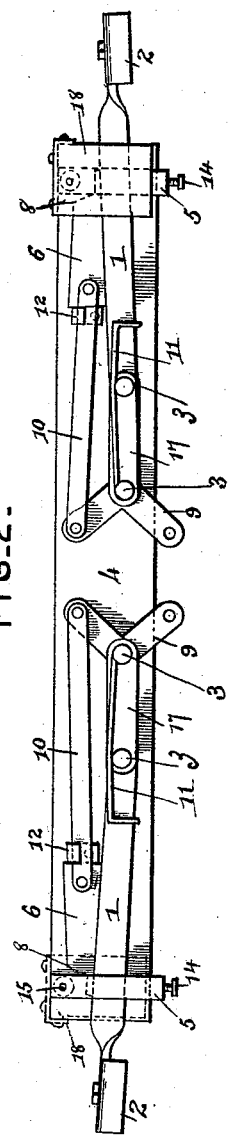
Witnesses
Jas. K. McCathran
H. F. Riley
Inventor
Alexander T. Bodle
By his Attorneys,
C. A. Snow & Co.
THE NORRIS PETERS CO., PHOTO-LITHO., WASHINGTON, D. C.

UNITED STATES PATENT OFFICE.

ALEXANDER THOMPSON BODLE, OF LUZERNE, PENNSYLVANIA.

BRAKE FOR VEHICLES.

SPECIFICATION forming part of Letters Patent No. 461,414, dated October 20, 1891.

Application filed June 4, 1891. Serial No. 395,047. (No model.)

*To all whom it may concern:*

Be it known that I, ALEXANDER THOMPSON BODLE, a citizen of the United States, residing at Luzerne, in the county of Luzerne and State of Pennsylvania, have invented a new and useful Brake, of which the following is a specification.

The invention relates to improvements in vehicle-brakes.

The object of the present invention is to simplify and improve the construction of brakes, to enable the same to be readily applied to a vehicle, and to render them capable ble of blocking the wheels with great force.

A further object of the invention is to enable the brake mechanism to be adjusted to take up the wear of the brake-shoes.

The invention consists in the construction and novel combination and arrangement of parts hereinafter fully described, illustrated in the accompanying drawings, and pointed out in the claims hereto appended.

In the drawings, Figure 1 is a perspective view of brake mechanism constructed in accordance with this invention, the parts being in position for braking the wheels. Fig. 2 is a plan view showing the brake-shoes withdrawn. Fig. 3 is a transverse sectional view, the parts being in the position shown in Fig. 1.

Referring to the accompanying drawings, 1 1 designate brake-bars provided at their outer ends with brake-shoes 2 and having their inner ends pivoted by bolts 3 to a cross-bar 4, which is secured to the running-gear of a vehicle, and is preferably attached to the upper faces of the rear hound and is arranged to bring the brake-shoes close to the wheels. The brake-bars are arranged on the upper face of the cross-bar, and are arranged in guide-loops 5, and are adapted to swing or move laterally in the same to carry the brake-shoes 2 into and out of engagement with the wheels, and the outer ends of the brake-bars are provided with a half-twist and are secured in recesses of the brake-shoes.

The brake is applied by sliding wedges 6, which are adapted to slide longitudinally of the cross-bar 4, and pass between the front ends of the loops and the brake-bars to force the latter rearward and to carry the brake-shoes into engagement with the wheels, and arranged in the loops near their front ends are anti-friction wheels 7. The sliding wedges 6 are provided near their outer ends with inclined shoulders 8, which give the brake bars and shoes a quick motion and carry the latter within a very short distance of the wheels, and the continued movement of the sliding wedges 6 is slow and gradual and they exert great force and securely hold the brake-shoes against the wheels. The inclined shoulders which give the quick motion at the starting of the brake to enable the brake-shoes to be normally arranged some distance from the wheels to prevent the accumulation of dirt and mud, which not only retard and interfere with the operation of the brake, but also add considerable weight to a vehicle, and in cold weather there is a liability of brakes becoming frozen and inoperative. The sliding wedges are connected with L-shaped levers 9, which are fulcrumed at their angles, and they have their front arms attached to the inner ends of connecting-bars 10, which have their outer ends secured to the sliding wedges. The rear arms are designed to be connected by rods with an operating-lever, (which parts are not shown.)

The brake-bars are normally held out of engagement with the wheels by springs 11, which have their inner ends secured to the pivots to the L-shaped levers and have their outer ends bent at an angle and engaging the sides of the pivoted brake-bars, and they bear intermediate their ends against the bolts 3, which are recessed to receive the springs. The connecting-bars are prevented being thrown outward by guide-hooks 12 secured to the upper face of the cross-bar 4.

The guide-loops 5 are each constructed of a single piece of metal, which is bent to form a rectangular loop arranged on the upper face of the cross-bar, and is bent to form an L-shaped extension 13, the long arm of which is arranged on the lower arm, which is arranged on the lower face of the cross-bar. The brake-shoe is adjusted to take up wear by a set-screw 14, which is arranged in a threaded opening of the short arm of the L-shaped extension 13 and engages the edge of the cross-bar and draws the sliding loop rearward; and the bolt 15, which serves as a spindle for the anti-friction roller, is arranged in a slot 16 of the cross-bar, and the latter is grooved on its upper face to receive the sliding loop. The slot 16 is constructed of suitable length and it limits the adjustment of the brake-shoes. The springs 11 are supported by plates 17, which extend from the inner ends of the pivoted brake-bars to the angles of the L-shaped levers.

It will be seen that the brake is simple and inexpensive in construction and powerful in operation, and is adapted to hold and exert any amount of pressure without the necessity of employing ratchets or their equivalents, and is capable of being adjusted to take up the wear of brake-shoes.

In practice the cross-bar is designed to be provided at its ends with step-plates 18, which will form guards to shield the guide-loops from mud and to prevent the wedges becoming clogged. The plates 17, besides supporting the springs, serve to brace the parts and increase the strength of the brake mechanism.

What I claim is—

1. In a brake, the combination of a cross-bar 4, a brake-bar having its inner end pivoted on the cross-bar and provided at its outer end with a brake-shoe, an L-shaped lever fulcrumed at its angle on the cross-bar, a sliding wedge arranged to engage the brake-bar and carry the shoe in engagement with a wheel, and a bar 10, connected to the wedge of the L-shaped lever, the other arm of the lever being adapted to be connected to suitable operating mechanism, substantially as described.

2. In a brake, the combination of the guide-loop, the brake-bar arranged in the guide-loop and carrying a brake-shoe, and the sliding wedge arranged to engage the brake-bar and provided with an inclined shoulder 8, adapted to give a quick motion to the brake-shoe and being wedge-shaped back of the shoulder, substantially as and for the purpose described.

3. In a brake, the combination of the guide-loop, the pivoted brake-bar arranged in the guide-loop and carrying a brake-shoe, the sliding wedge arranged to engage the brake-bar, the L-shaped lever, the bar connecting the sliding wedge and the lever, a spring arranged to hold the brake-bar normally out of engagement with the wheel and the guide-hook, substantially as described.

4. The combination, with the cross-bar 4, of the guide-loop having a limited movement thereon and provided with a set-screw arranged to engage the cross-bar, the brake-bar carrying a brake-shoe, and the sliding wedge, substantially as described.

5. The combination of the cross-bar provided with a slot, the guide-loop arranged on the cross-bar and provided with an L-shaped extension arranged beneath the cross-bar, the anti-friction wheel, the bolt securing the guide-loop to the cross-bar and arranged in the slot of the latter and forming a spindle for the wheel, substantially as described.

In testimony that I claim the foregoing as my own I have hereto affixed my signature in presence of two witnesses.

ALEXANDER THOMPSON BODLE.

Witnesses:
  E. L. MULLIGAN,
  WILL P. BILLINGS.